United States Patent [19]

Akutsu et al.

[11] Patent Number: 4,771,547

[45] Date of Patent: Sep. 20, 1988

[54] CORRECTION APPARATUS FOR AN AZIMUTH CALCULATING SYSTEM

[75] Inventors: Kazushi Akutsu, Oobu; Hitoshi Ichikawa, Kariya, both of Japan

[73] Assignee: Nippondenso Co., Ltd., Kariya, Japan

[21] Appl. No.: 922,464

[22] Filed: Oct. 23, 1986

[30] Foreign Application Priority Data

Oct. 23, 1985 [JP] Japan ............... 60-237010

[51] Int. Cl.$^4$ ........................... G01C 17/28
[52] U.S. Cl. ........................... 33/356; 33/361
[58] Field of Search ............. 33/361, 362, 356, 363 R, 33/363 Q, 355, 349, 351, 352, 360

[56] References Cited

U.S. PATENT DOCUMENTS

| | | | |
|---|---|---|---|
| 4,413,424 | 11/1983 | Sasaki et al. | 33/361 |
| 4,416,067 | 11/1983 | Scherer et al. | |
| 4,480,226 | 10/1984 | Kuno et al. | 33/361 |
| 4,555,761 | 11/1985 | Matsumoto et al. | 33/356 X |

FOREIGN PATENT DOCUMENTS

| | | | |
|---|---|---|---|
| 3208481 | 9/1982 | Fed. Rep. of Germany | 33/361 |
| 26213 | 2/1983 | Japan | 33/361 |
| 28611 | 2/1983 | Japan | 33/361 |

*Primary Examiner*—William D. Martin, Jr.

*Attorney, Agent, or Firm*—Cushman, Darby & Cushman

[57] ABSTRACT

A correction apparatus for an azimuth calculation system which includes an azimuth sensor mounted on a moving body for producing two mutually perpendicular magnetic field components relative to the earth's magnetism acting thereon, and wherein the azimuth sensor is moved in a full circle so that an azimuth circle is formed by the two magnetic field components. The correction apparatus is arranged to store a plurality of interspaced X-axis lines in parallel with the abscissa of a right-angled coordinate and a plurality of interspaced Y-axis lines in parallel with the ordinate of the coordinate, to determine maximum and minimum values respectively defined by intersections of the azimuth circle with the X-axis lines and maximum and minimum values respectively defined by intersections of the azimuth circle with the Y-axis lines, to determine first and second center values of the azimuth circle based on each mean value of the first-named maximum and minimum values and the second-named maximum and minimum values, to correct the magnetic field components respectively in accordance with the first and second center values, and to calculate a direction of the moving body on a basis of the corrected magnetic field components.

6 Claims, 5 Drawing Sheets

CORRECTION APPARATUS FOR AN AZIMUTH CALCULATING SYSTEM

BACKGROUND OF THE INVENTION

1. Field of the Invention

The present invention relates to an azimuth calculation system which includes an azimuth sensor mounted on a moving body such as an automotive vehicle for calculating a direction of the moving body on a basis of the two components of the magnetic field measured in the azimuth sensor in relation to the earth's magnetism, and more particularly to a correction apparatus for the azimuth calculation system to correct various errors in the two magnetic field components caused by magnetization of the moving body.

2. Description of the Prior Art

In Japanese Patent Early Publication No. 57-148210, there has been proposed a correction method for an azimuth calculation system which comprises the steps of rotating the moving body by 360° so that an azimuth circle is formed by the two magnetic field components, determining maximum and minimum values of one of the two magnetic field components on the azimuth circle to calculate a mean value of the maximum and minimum values, determining maximum and minimum values of the other magnetic field component on the azimuth circle to calculate a mean value of the maximum and minimum values, and correcting an error in the two magnetic field components on a basis of the calculated mean values. In such a conventional correction method, however, it has been found that if a portion of the azimuth circle is radially outwardly distorted due to undesired noises respectively acting on the two magnetic field components, the mean values for correction of the error will not be calculated in a precise manner due to distortion of the azimuth circle.

SUMMARY OF THE INVENTION

It is, therefore, a primary object of the present invention to provide a correction apparatus capable of correcting various errors in the two magnetic field components as precisely as possible, in spite of distortion of the azimuth circle.

According to the present invention, the object is attained by providing a correction apparatus for an azimuth calculation system which includes an azimuth sensor mounted on a moving body such as an automotive vehicle for producing two mutually perpendicular magnetic field components relative to the earth's magnetism acting thereon, and wherein the azimuth sensor is moved in a full circle so that an azimuth circle is formed by the two magnetic field components. The correction apparatus comprises first means for storing a plurality of interspaced X-axis lines in parallel with the abscissa of a right-angled coordinate and a plurality of interspaced Y-axis lines in parallel with the ordinate of the coordinate; second means for determining maximum and minimum values respectively defined by intersections of the azimuth circle with the X-axis lines and for determining maximum and minimum values respectively defined by intersections of the azimuth circle with the Y-axis lines; third means for determining a first center value of the azimuth circle based on a mean value of the first-named maximum and minimum values and for determining a second center value of the azimuth circle based on a mean value of the second-named maximum and minimum values; fourth means for correcting the magnetic field components respectively in accordance with the first and second center values; and fifth means for calculating a direction of the moving body on a basis of the corrected magnetic field components.

It is preferable that the correction apparatus further comprises means for determining a first radius of the azimuth circle based on a mean value of the halved differences between the first-named maximum and minimum values and for determining a second radius of the azimuth circle based on a mean value of the halved differences between the second-named maximum and minimum values, and means for selectively correcting the corrected magnetic field components in accordance with the first and second radiuses.

BRIEF DESCRIPTION OF THE DRAWINGS

Other objects, features and advantages of the present invention will become more readily apparent from the following detailed description of a preferred embodiment thereof when taken together with the accompanying drawings, in which.

DESCRIPTION OF THE PREFERRED EMBODIMENT

Figure 1:
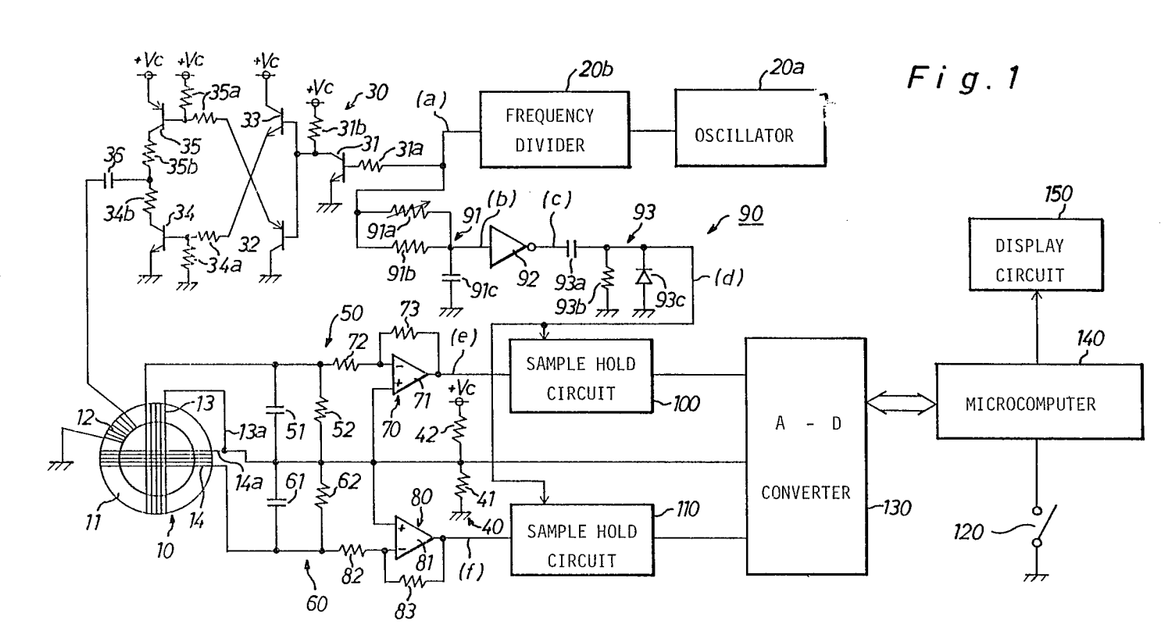
FIG. 1 is a schematic block diagram of an azimuth calculation system to which is adapted an embodiment of the present invention.

FIG. 1 of the drawings illustrates an azimuth calculation system for automotive vehicles to which is adapted an embodiment of the present invention. The azimuth calculation system includes an azimuth sensor 10 which is constructed with an excitation winding 12 wound on an annular ferromagnetic core 11 and a pair of output windings 13, 14 wound on core 11 perpendicularly relative to one another. The azimuth sensor 10 is mounted on an appropriate portion of the vehicle and is placed in the earth's magnetism so that the output windings 13 and 14 produce first and second output voltages therefrom in accordance with the earth's magnetism acting thereto while the excitation winding 12 is being energized.

The azimuth calculation system further includes an oscillator 20a, a frequency divider 20b connected to oscillator 20a, and an excitation circuit 30 interposed between the frequency divider 20b and excitation winding 12 of azimuth sensor 10. The oscillator 20a produces an oscillation pulse at a predetermined frequency, and the frequency divider 20b divides the oscillation pulse in frequency to produce the divided oscillation pulses. The excitation circuit 30 includes a transistor 31 of the NPN type which is connected at its base to an output terminal of frequency divider 20b through a resistor 31a and at its collector to a positive terminal +Vc of a direct current (or DC) source through a resistor 31b. The transistor 31 acts to current-amplify the respective divided pulses from frequency divider 20b so as to produce a series of current amplification pulses from its collector.

The excitation circuit 30 further includes a transistor 32 of the PNP type and a transistor 33 of the NPN type which are respectively connected at their bases to the collector of transistor 31. The transistor 32 is grounded at its collector, and the transistor 33 is connected at its collector to the positive terminal +Vc of DC source. The transistor 32 and 33 act to further amplify the current amplification pulses from transistor 31 in current so as to output a series of the current amplification pulses from their emitters, respectively. A transistor 34 of the NPN type is grounded at its emitter and connected at its base to the emitter of transistor 33 through resistors 34a of low resistance value. A transistor 35 of the PNP type is connected at its emitter to the positive terminal +Vc of DC source and at its base to the emitter of transistor 32 through resistors 35a of low resistance value. The collector of transistor 35 is connected to the collector of transistor 34 through resistors 35b and 34b. Thus, the transistors 34 and 35 act to further amplify the current amplification pulses from transistors 32 and 33 in current under control of the resistors 34a and 35a so as to output a series of excitation pulses therefrom. A DC cut-off capacitor 36 is connected to a common terminal of resistors 34b and 35b to apply therethrough the excitation pulses to the excitation winding 12 of azimuth sensor 10.

The azimuth calculation system further comprises a common voltage generator 40 connected to the output windings 13, 14 of azimuth sensor 10, a pair of filter circuits 50 and 60 connected to the output windings 13, 14 respectively, a pair of amplifiers 70 and 80 respectively connected to the filter circuits 50, 60, and a sampling pulse generator 90 connected to the frequency divider 20b. The common voltage generator 40 consists of resistors 41 and 42 which are connected in series to each other to divide the DC voltage applied thereto from the DC source into a common or standard voltage COM (for instance, 2.5 V). Thus, the output windings 13 and 14 are applied with the common voltage COM from the common voltage generator 40 at their common terminals 13a, 14a to produce the first and second output voltages under control of a standard level defined by the common voltage COM.

The filter circuit 50 includes a capacitor 51 and a resistor 52 which are connected in parallel to the output winding 13 to filter the first output voltage of winding 13 so as to produce it as a first filtered alternating current (or AC) voltage. Similarly, the filter circuit 60 includes a capacitor 61 and a resistor 62 which are connected in parallel to the output winding 14 to filter the second output voltage of winding 14 so as to produce it as a second filtered AC voltage. The amplifier 70 is in the form of an operational amplifier 71 which is connected at its plus terminal to the output terminal of common voltage generator 40 and connected at its minus terminal to the output terminal of filter circuit 50 through an input resistor 72 and to its ouput terminal through a feed-back resistor 73. Thus, the operational amplifier 71 acts to amplify the first filtered AC voltage from filter circuit 50 with an amplification factor defined by the input resistor 72 and feed-back resistor 73 under control of the common voltage COM so as to produce it as a first amplified AC voltage. Similarly, the amplifier 80 is in the form of an operational amplifier 81 which is connected at its plus terminal to the output terminal of common voltage generator 40 and connected at its minus terminal to the output terminal of filter circuit 60 through an input resistor 82 and to its output terminal through a feed-back resistor 83. Thus, the operational amplifier 81 acts to amplify the second filtered AC voltage from filter circuit 60 with an amplification factor defined by the input resistor 82 and feedback resistor 83 under control of the common voltage COM so as to produce it as a second amplified AC voltage.

The sampling pulse generator 90 includes an integrator 91 connected to the frequency divider 20b, and a differentiator 93 connected in series to the integrator 91 through an inverter 92. The integrator 91 consists of a variable resistor 91a and a resistor 91b which are connected in parallel to each other and connected to a capacitor 91c. The integrator 91 acts to integrate the leading and trailing edges of the divided pulse from frequency divider 20b at an integration time constant defined by the resistors 91a, 91b and capacitor 91c so as to produce an integration pulse therefrom. The integration time constant can be varied by adjustment of the variable resistor 91a.

The inverter 92 is arranged to invert the level of the integration pulse from integrator 91 so as to produce a rectangular wave pulse therefrom. The inversion of the integration pulse is conducted on a basis of a threshold level of inverter 92 which is determined to be approximately half of a maximum level of the integration pulse. The differentiator 93 includes a capacitor 93a connected to the inverter 92, a resistor 93b connected in series with capacitor 93a, and a diode 93c connected in parallel with resistor 93b. The differentiator 93 is arranged to differentiate the leading edge of the rectangular wave pulse from inverter 92 at a differentiation time constant defined by the capacitor 93a and resistor 93b so as to produce a positive differential pulse. In the differentiator 93, the capacitor 93a cooperates with the diode 93c to differentiate the trailing edge of the rectangular wave pulse so as to produce a negative differential pulse. In this instance, the diode 93c restrains the peak value of the negative differential pulse. Thus, the sampling pulse generator 90 produces the positive differential pulse as a sampling pulse.

The azimuth calculation system further comprises a pair of sample hold circuits 100 and 110 connected to the sampling pulse generator 90 to be applied with the sampling pulse. The sample hold circuit 100 is arranged to hold the first amplified AC voltage from amplifier 70 in response to the sampling pulse from sampling pulse generator 90 so as to produce a first sample hold signal with a DC level X defined by the holded AC voltage. Similarly, the sample hold circuit 110 is arranged to hold the second amplified AC voltage from amplifier 80 in response to the sampling pulse from sampling pulse generator 90 so as to produce a second sample hold signal with a DC level Y defined by the holded AC voltage.

Figure 3:
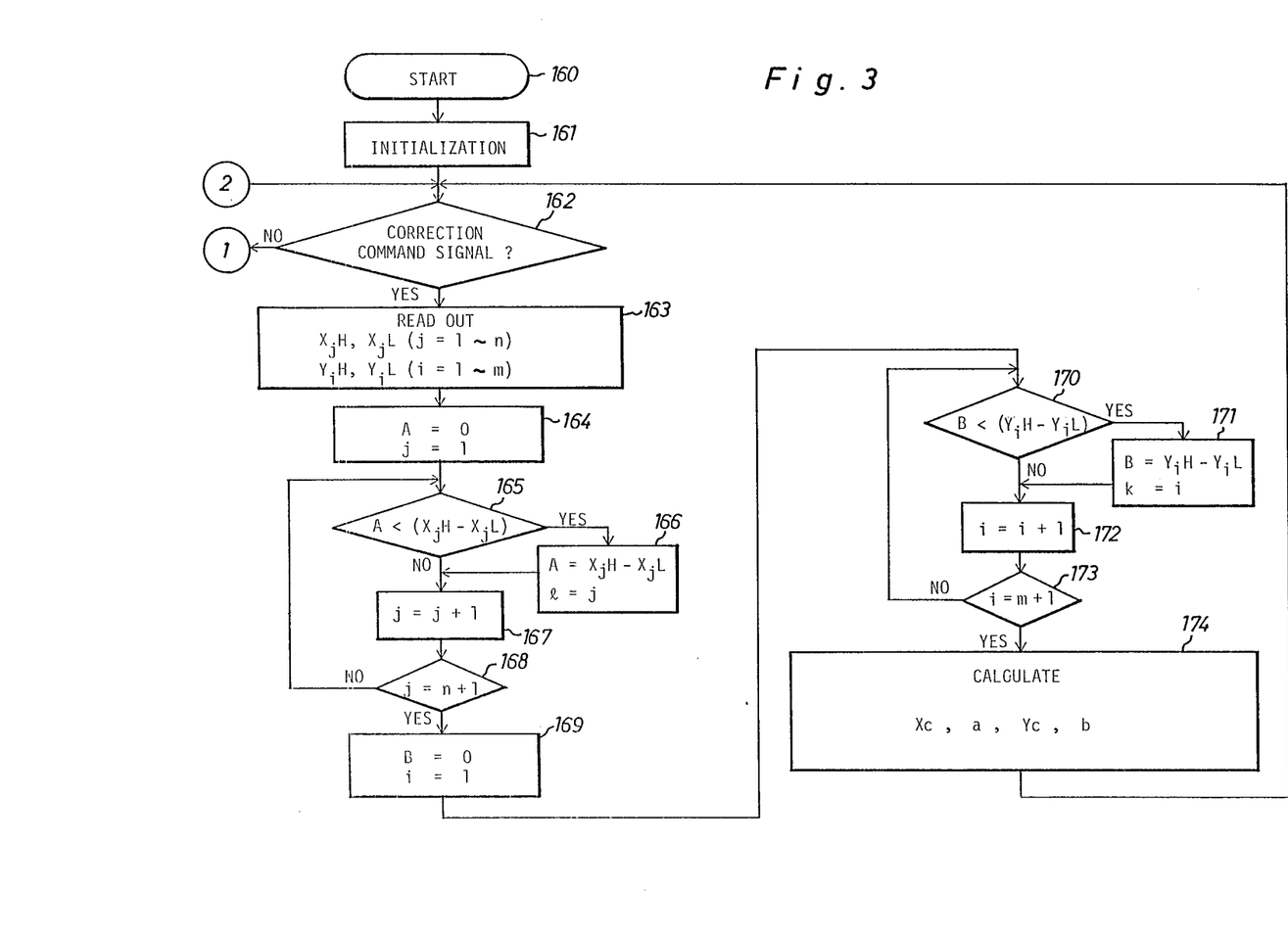
FIGS. 3 and 4 illustrate a flow chart of a computer program executed by a microcomputer shown in FIG. 1.

The azimuth calculation system further comprises a user actuable normally open correction switch 120 arranged to produce a correction command signal therefrom when it is closed, and an analog-to-digital (or A-D) converter 130 arranged to convert the first and second sample hold signals from sample hold circuits 100, 110 into digital signals respectively indicative of DC levels X and Y. A microcomputer 140 is connected to the correction switch 120 and the A-D converter 130 and has a read-only memory (or ROM) which is arranged to previously store therein a computer program illustrated by a flow chart in FIGS. 3 and 4. In operation, the computer 140 executes the computer program in accordance with the digital signals and correction command signal applied thereto respectively from the A-D converter 130 and correction switch 120 to produce an output signal necessary for indicating a moving direction of the vehicle and apply it to a display circuit 150 connected thereto.

Assuming that in operation of the azimuth calculation system the frequency divider 20b cooperates with the oscillator 20a to produce a series of divided pulses therefrom, the excitation circuit 30 produces a series of excitation pulses in response to the divided pulses from frequency divider 20b to apply them to the excitation winding 12 of azimuth sensor 10. When applied with the excitation pulses, the excitation winding 12 is energized to generate a magnetic field in core 11. Even if the ambient temperature changes during such operation of the excitation circuit 30, fluctuation in voltage between the emitter and collector of transistor 34 and between the emitter and collector of transistor 35 will be maintained in an extremely small value under control of the resistors 34a and 35a. This enables effecting a stable energization of the excitation winding 12 in response to the excitation pulses from circuit 30 so as to produce first and second output voltages from windings 13 and 14 without any error caused by changes of the ambient temperature.

Figure 2:
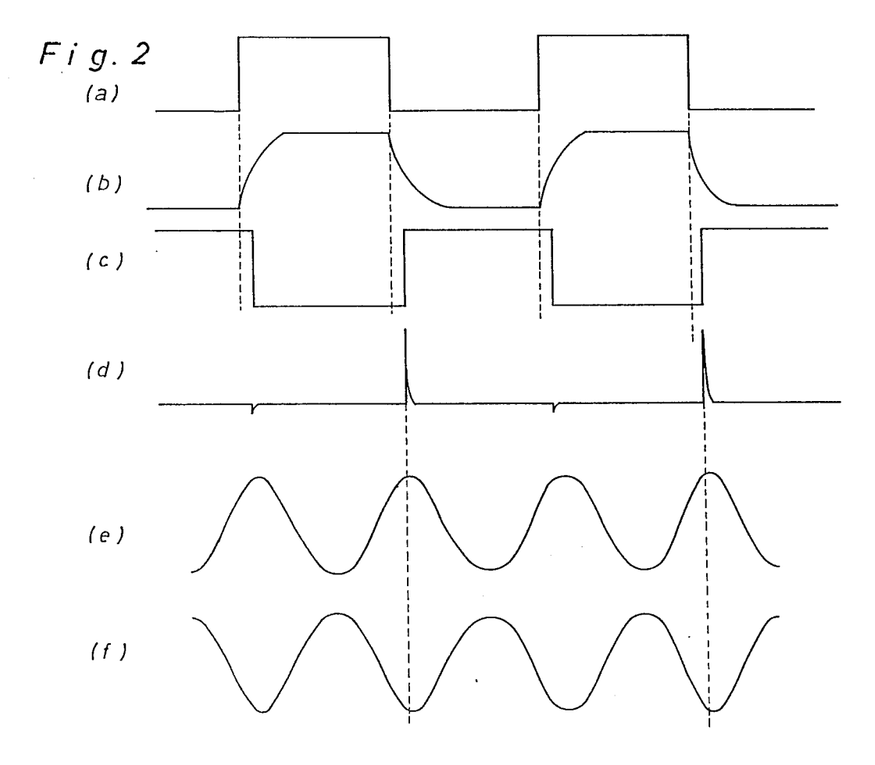
FIG. 2 illustrates input and output signals in a sampling pulse generator and a pair of sample hold circuits shown in FIG. 1.

Meanwhile, the integrator 91 of sampling pulse generator 90 starts to integrate the leading and trailing edges of the respective divided pulses (a) from frequency divider 20b at the predetermined integration time constant and to produce a series of integration pulses (b) as shown in FIG. 2. Subsequently, the integration pulses (b) are successively inverted by the inverter 92 in relation to its threshold level and produced as a series of rectangular wave pulses (c) as shown in FIG. 2. In this instance, the rectangular wave pulses (c) are produced with a time delay respectively at the leading and trailing edges thereof. Thus, the differentiator 93 differentiates each leading edge of the rectangular wave pulses (c) at its differential time constant to produce a series of sampling pulses (d) as shown in FIG. 2 and apply them to the sample hold circuits 100 and 110.

When the output windings 13 and 14 of azimuth sensor 10 produce first and second output voltages therefrom in accordance with the earth's magnetism under control of the common voltage COM, the filter circuit 50 produces a first filtered AC voltage in response to the first output voltage from winding 13, while the filter circuit 60 produces a second filtered AC voltage in response to the second output voltage from winding 14. Subsequently, the amplifiers 70 and 80 produce first and second amplified AC voltages (e), (f) therefrom in response to the first and second filtered AC voltages, as shown in FIG. 2, and apply them to the sample hold circuits 100 and 110.

Thus, the sample hold circuits 100 and 110 hold the first and second amplified AC voltages (e), (f) in response to the sampling pulse (d) from sampling pulse generator 90 to produce first and second sample hold signals therefrom. Since the integration time constant is previously determined by adjustment of the variable resistor 91a in such a manner that the sampling pulse (d) is produced from sampling pulse generator 90 when the first and second amplified AC voltages (e), (f) each are at a positive or negative peak level, the time period of the sampling pulse becomes double each time period of the first and second amplified AC voltages. Thus, each value of the first and second sample hold signals will alternately correspond with each peak value of the first and second amplified AC voltages from amplifiers 70 and 80. As a result, even if the first and second amplified AC voltages each are different in their adjacent AC wave forms and the same in their alternate AC wave forms, each value of the first and second sample hold signals will be maintained substantially at the same level over time. It is, therefore, able to eliminate an error caused by a difference between the adjacent AC wave forms of the respective output voltages from azimuth sensor 10. Furthermore, even if the first and second output voltages are irregularly produced from azimuth sensor 10, the first and second sample hold signals will be maintained at a desired level by adjustment of the variable resistor 91a of sampling pulse generator 90. This is effective to eliminate an error caused by irregularity in the characteristic of azimuth sensor 10.

Figure 6:
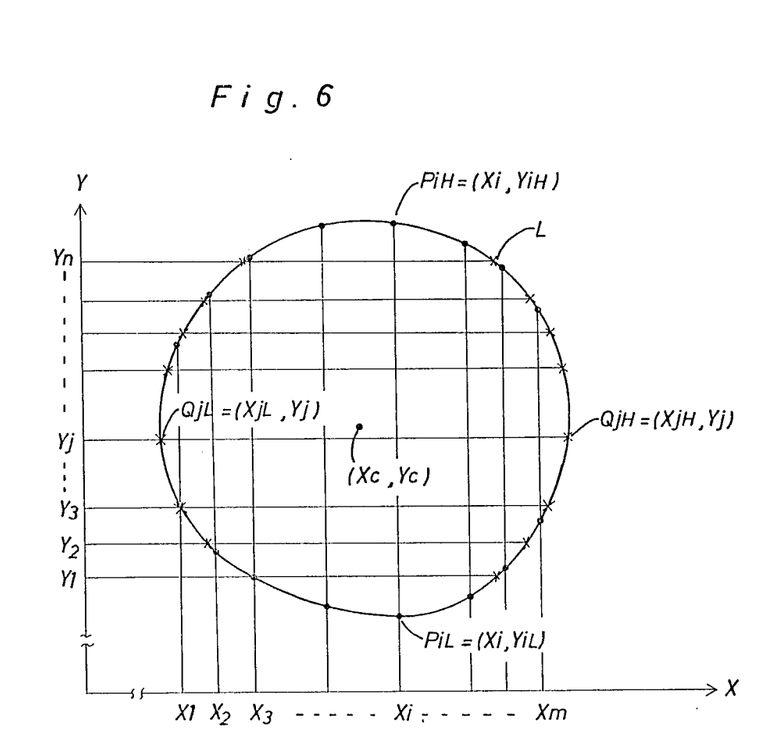
FIG. 6 illustrates a calculation method for correction of an error in the two magnetic field components.

In such operation of the azimuth calculation system as described above, the vehicle carrying the azimuth sensor 10 is driven in a full circle so that as shown in FIG. 6, an azimuth circle L is formed by two magnetic field components X and Y in the form of the respective DC levels of the first and second sample hold signals, and the correction switch 120 is closed to produce a correction command signal therefrom. During the circular travel of the vehicle, the computer 140 starts to execute the previously stored computer program at step 160 shown in FIG. 3, begining by initializing the program at step 161. At the following step 162, the computer 140 determines a "Yes" answer under the presence of the correction command signal from switch 120 and causes the program to proceed to step 163. Then, the computer 140 is applied with the first and second sample hold signals through the A-D converter 130 at step 163. One such signal causes computer 140 to read out maximum and minimum values $Y_1H, Y_1L; Y_2H, Y_2L; Y_3H, Y_3L; \ldots Y_iH, Y_iL; Y_mH, Y_mL$ respectively defined by intersections of a plurality of interspaced Y-axis lines with the azimuth circle L at values $X_1, X_2, X_3 \ldots X_i \ldots X_m$ on the abscissa of a right-angled coordinate system in FIG. 6. The other signal causes computer 140 to read out maximum and minimum values $X_1H, X_1L; X_2H, X_2L; X_3H, X_3L; \ldots X_jH, X_jL; \ldots X_nH, X_nL$ respectively defined by intersections of a plurality of interspaced X-axis lines with the azimuth circle L at values $Y_1, Y_2, Y_3 \ldots Y_j \ldots Y_n$ on the ordinate of the right-angled coordinate system. In this embodiment, the interspaced Y-axis lines and X-axis lines on the right-angled coordinate system are previously stored in the ROM of computer 140.

Subsequently, the program proceeds to step 164 where the computer 140 sets $A=0$ and $j=1$, the value A being used to indicate a length of segment intersecting the azimuth circle L in parallel with the abscissa (the "X direction"). At the next step 165, the computer 140 calculates a value of $X_1H - X_1L$ by executing the more general calculation $X_jH - X_jL$ on a basis of $j=1$ step 165 determines if A is less than this quantity, and determines a "Yes" answer on the initial run since a length of segment determined by the maximum and minimum values $X_1H$ and $X_1L$ is larger than zero. The program proceeds to step 166, where the computer 140 sets $A = X_1H - X_1L$ ($j=1$) and sets $1=j$. Subsequently, the program proceeds to step 167 where the computer 140 increments the value j so that $j=2$ in this example and advances the program to step 168 whereas j is compared with n+1 for equality. The computer 140 determines a "No" answer and returns the program to step 165 since the value j=2 is less than n+1. Thereafter, the computer 140 will repeat the execution of steps 165–168 in dependence upon successive renewal of the value j at step 167 until a value of $X_jH - X_jL$ becomes smaller than the prior calculated value. This means that each length of segments respectively determined by the maximum and minimum values $X_1H, X_1L; X_2H, X_2L; \ldots$ is calculated in accordance with values $Y_1, Y_2 \ldots$ on the ordinate in FIG. 6. When the computer 140 determines a "No" answer at step 165, it causes the program to proceed to step 167 without renewal of the calculated value at step 166. This means that a maximum value of $X_jH - X_jL$ coincides with a length of segment between intersections $Q_jL$, $Q_jH$ of the X-axis line with the azimuth circle L at the value $Y_j$ on the ordinate in FIG. 6. This maintains the value A as in the maximum value of $X_jH - X_jL$. The computer 140 will repeat the execution at steps 165, 167, 168 until the value j becomes equal to n+1.

When the computer 140 determines a "Yes" answer at step 168, the program proceeds to step 169 where the computer 140 sets B=0 and i=1, the value B being used to indicate a length of segment intersecting the azimuth circle L in parallel with the ordinate of the coordinate system. At the following step 170, the computer 140 calculates a value of $Y_1H - Y_1L$ on a basis of i=1 and determines a "Yes" answer since a length of segment determined by the maximum and minimum values $Y_1H$ and $Y_1L$ is larger than zero. When the program proceeds to step 171, the computer 140 sets $A = Y_1H - Y_1L$ and k=i=1. Subsequently, the program proceeds to step 172 where the computer 140 increments the value i as i=2 and causes the program to proceed to step 173. Then, the computer 140 determines a "No" answer and returns the program to step 170 since the value i=2 is less than m+1. Thereafter, the computer 140 will repeat the execution at steps 170–173 in dependence upon successive renewal of the value i at step 172 until a value of $Y_iH - Y_iL$ becomes smaller than the prior calculated value. This means that each length of segments respectively determined by the maximum and minimum values $Y_1H, Y_1L; Y_2H, Y_2L; \ldots$ is calculated in accordance with values $X_1, X_2 \ldots$ on the abscissa in FIG. 6. When the computer 140 determines a "No" answer at step 170, it causes the program to proceed to step 172 without renewal of the calculated value at step 171. This means that a maximum value of $Y_iH - Y_iL$ coincides with a length of segment between intersections $P_iL$, $P_iH$ of the Y-axis line with the azimuth circle L at the value $X_i$ on the abscissa in FIG. 6. Thereafter, in a condition where the value B is maintained in the maximum value of $Y_iH - Y_iL$, the computer 140 will repeat the execution at steps 170, 172, 173 until the value i becomes equal to m+1.

When the computer 140 determines a "Yes" answer at step 173, the program proceeds to step 174 where the computer 140 calculates a center value Xc of the azimuth circle L and a radius a of the azimuth circle L in parallel with the abscissa on a basis of the following equations (1) and (2) which are previously stored in the ROM of computer 140.

$$Xc = \left( \sum_{j=l-N}^{l-1} (X_jH + X_jL) + \sum_{j=l+1}^{l+N} (X_jH + X_jL) \right) / 4N \quad (1)$$

-continued $$a = \left( \sum_{j=l-N}^{l-1} (X_jH - X_jL) + \sum_{j=l+1}^{l+N} (X_jH - X_jL) \right) / 4N \quad (2)$$

where l is an integer for defining a maximum value of $X_jH - X_jL$, and N is an integer for defining at least even pair of arithmetical mean values of $X_jH$ and $X_jL$.

At step 174, the computer 140 further calculates a center value Yc of the azimuth circle L and a radius b of the azimuth circle L in parallel with the ordinate on a basis of the following equations (3) and (4) which are previously stored in the ROM of computer 140.

$$Yc = \left( \sum_{i=k-N}^{k-1} (Y_iH + Y_iL) + \sum_{i=k+1}^{k+N} (Y_iH + Y_iL) \right) / 4N \quad (3)$$

$$b = \left( \sum_{i=k-N}^{k-1} (Y_iH - Y_iL) + \sum_{i=k+1}^{k+N} (Y_iH - Y_iL) \right) / 4N \quad (4)$$

As will be understood from the above equations, the center value Xc of the azimuth circle L is determined as a mean value of plural arithmetical mean values of $X_jH$ and $X_jL$, the radius a is determined by a mean value of plural arithmetical mean values of halved differences between $X_jH$ and $X_jL$, the center value Yc of the azimuth circle L is determined by a mean value of plural arithmetical mean values of $Y_iH$ and $Y_iL$, and the radius b is determined by a mean value of plural arithmetical mean values of halved differences between $Y_iH$ and $Y_iL$. In such determination of the respective center values Xc and Yc and radii a and b, an error can be avoided even if the azimuth circle L is partly distorted due to undesired noises acting on the two magnetic field components of azimuth sensor 10. For example, even if some of the values $X_jH, X_jL, Y_iH$ and $Y_iL$ correspond with a distorted portion of the azimuth circle L, an error in determination of the respective center values Xc and Yc and radii a and b will be reduced to a value of $\frac{1}{4}N$. Furthermore, if a pulse-like noise exists in a space between the X-axis lines and Y-axis lines, an error caused by the pulse-like noise will be avoided in determination of the respective centers Xc and Yc and radii a and b.

Figure 4:
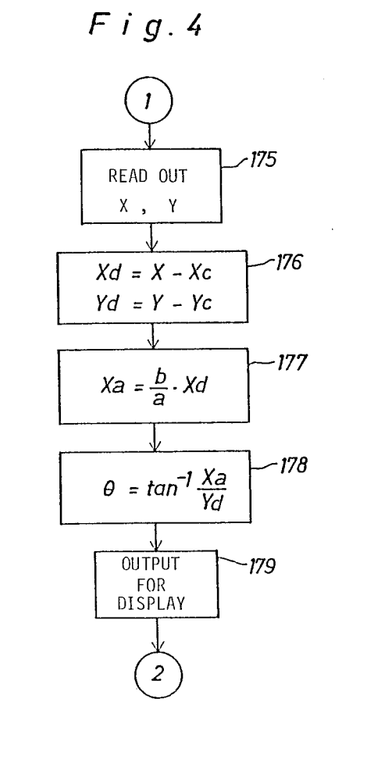
Figure 5:
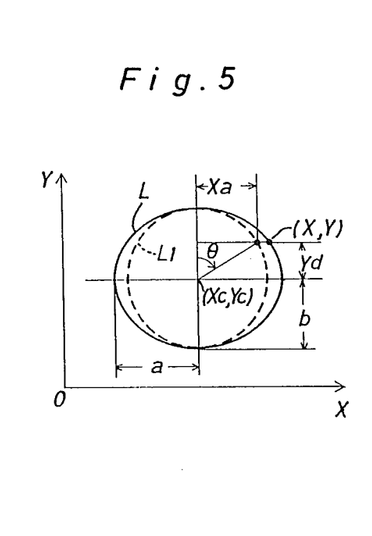
FIG. 5 illustrates distortion of an azimuth circle defined by the two magnetic field components in an azimuth sensor.

When the correction switch 120 is opened after determination of the respective center values Xc and Yc and radii a and b at step 174, the computer 140 determines a "No" answer at step 162 and causes the program to proceed to step 175 shown in FIG. 4. At step 175, the computer 140 is applied with the first and second sample hold signals through the A-D converter 130 to read out the mutually perpendicular components X and Y of the magnetic field for calculation of a moving direction of the vehicle. When the program proceeds to step 176, the computer 140 subtracts the calculated center values Xc and Yc from the component values X and Y respectively to set the subtracted values as values $X_d$ and $Y_d$. At the following step 177, the computer 140 divides the calculated radius b by the calculated radius a and multiplies the divided value (b/a) by the set value $X_d$ to set the multiplied value as a value Xa. Thus, even if the azimuth circle L is distorted as shown in FIG. 5, the value $X_d$ will be compensated to the correct value Xa on a normal azimuth circle $L_1$. When the program proceeds to step 178, the computer 140 calculates the moving direction of the vehicle on a basis of an equation $\theta = \tan^{-1}(X_a/Y_d)$. Subsequently, at the following step 179, the computer 140 produces an output signal indicative of the moving direction $\theta$ of the vehicle and apply it to the display circuit 150.

Although in the above embodiment the equations (1)–(4) have been adapted to determine the values Xc, Yc, a and b, the following equations (5)–(8) may be adapted for substitution of them.

$$Xc = (X_lH + X_lL)/2 \quad (5)$$

$$a = (X_lH - X_lL)/2 \quad (6)$$

$$Yc = (Y_kH + Y_kL)/2 \quad (7)$$

$$b = (Y_kH - Y_kL)/2 \quad (8)$$

What is claimed is:

1. A correction apparatus for an azimuth calculation system which includes an azimuth sensor mounted on a moving body such as an automotive vehicle for producing two mutually perpendicular magnetic field components relative to the earth's magnetism acting thereon, and wherein the azimuth sensor is moved in a full circle so that an azimuth circle is formed by the two magnetic field components, comprising:
   first means for storing a plurality of interspaced X-axis lines in parallel with an abscissa of a right-angled coordinate system and for storing a plurality of interspaced Y-axis lines in a parallel with an ordinate of said right-angled coordinate system;
   second means, connected to said first means, for reading said X-axis lines and said Y-axis lines from said first means and for determining an X maximum and an X minimum value among first segment lengths respectively defined by intersections of the azimuth circle with said X-axis lines and for determining a Y maximum and a Y minimum values among second segment lengths respectively defined by intersections of the azimuth circle with said y-axis lines;
   third means, connected to said second means to receive said X maximum, X minimum, Y maximum, and Y minimum values, for determining a first center value of the azimuth circle bsed on a mean value between said X maximum value and said X minimum values and for determining a second center value of the azimuth circle based on a mean value between said Y maximum value and said Y minimum values;
   fourth means, connected to said third means to receive said first and second center values, for correcting the magnetic field components respectively in accordance with said first and second center values to produce corrected magnetic field components; and
   fifth means, connected to said fourth means to receive said corrected magnetic field components, for calculating a direction of said moving body on a basis of the corrected magnetic field components.

2. A correction apparatus for an azimuth calculation system as claimed in claim 1, further comprising:
   means, connected to said second means, for determining a first radius of the azimuth circle by calculating a mean value of halved differences between said Y maximum and said X maximum values, and means, connected to said fifth means, for selectively correcting the corrected magnetic field components in accordance with the first and second radii.

3. A correction apparatus for an azimuth calculation system as claimed in claim 1, wherein said third means includes means for determining first and second center values Xc and Yc of the azimuth circle as:

$$c = \sum_{j=l-N}^{l-1}(X_jH + X_jL) + \sum_{j=l+1}^{l+N}(X_jH + X_jL)/4N$$

$$Yc = \sum_{i=k-N}^{k-1}(Y_iH + Y_iL) + \sum_{i=k+1}^{k+N}(Y_iH + Y_iL)/4N.$$

where $X_jH$ is said X maximum value, $X_jL$ is said X minimum value, l is an integer for defining a maximum value of $X_jH - X_jL$, and N is an integer for defining at least an even pair of arithmetical mean values of $Y_jH$ and $X_jL$, and where $Y_iH$ is said Y maximum value, $Y_iL$ is said Y minimum value, and k is an integer for defining a maximum value of $Y_iH - Y_iL$.

4. A correction apparatus for an azimuth calculation system as claimed in claim 2, wherein said means for determining first and second radii of the azimuth circle includes means for determining first and second radii as:

$$a = \sum_{j=l-N}^{l-1}(X_jH - X_jL) + \sum_{j=l+1}^{l+N}(X_jH - X_jL)/4N$$

$$b = \sum_{i=k-N}^{k-1}(Y_iH - Y_iL) + \sum_{i=k+1}^{k+N}(Y_iH - Y_iL)/4N$$

where $X_jH$ is said X maximum value, $X_jL$ is said X minimum value, l is an integer for defining a maximum value of $X_jH - X_jL$, and N is an integer for defining at least even pair of arithmetical mean values of $X_jH$ and $X_jL$, and where $Y_iH$ is said Y maximum value, $Y_iL$ is said Y minimum value, and k is an integer for defining a maximum value of $Y_iH - Y_iL$.

5. A method for correcting an azimuth indication from an azimuth sensor mounting on a moving body such as an automobile, comprising the steps of:
   moving said azimuth sensor in a full circle while receiving two mutually perpendicular magnetic field components therefrom to form an azimuth circle from the two magnetic field components;
   storing a plurality of interspaced X-axis lines in parallel with an abscissa of a right angled coordinate system;
   storing a plurality of interspaced Y-axis lines in parallel with an ordinate of said right angled coordinate system;
   determining of plurality of first segment lengths respectfully defined by intersections of said azimuth circle with said X-axis lines;
   determining an X maximum among said first segment lengths;
   determining an X minimum among said first segment lengths;
   determining second segment lengths respectively defined by intersections of said azimuth circle with said Y-axis lines;
   determining Y maximum values among said second segment lengths;
   determining Y minimum values among said second segment lengths;
   determining a first center value of said azimuth circle as a mean value between said X maximum value and said X minimum values;

determining a second center value of said azimuth circle as a mean value between said Y maximum value and said Y minimum values;

correcting said magnetic field components from said azimuth center based on said first and second center values to produce corrected magnetic field components; and calculating a direction of said moving body based on said corrected magnetic field components.

6. A method as in claim 5 wherein said determining first and second center values step includes the step of calculating Xc and Yc as:

$$Xc = \sum_{j=l-N}^{l-1} (X_jH + X_jL) + \sum_{j=l+1}^{l+N} (X_jH + X_jL)/4N$$

$$Yc = \sum_{i=k-N}^{k-1} (Y_iH + Y_iL) + \sum_{i=k+1}^{k+N} (Y_iH + Y_iL)/4N,$$

where $X_jH$ is said X maximum value, $X_jL$ is said X minimum value, l is an integer for defining a maximum value of $X_jH - X_jL$, and N is an integer for defining at least even pair of arithmetical mean values of $Y_jH$ and $X_jL$, and where $Y_iH$ is said Y maximum value, $Y_iL$ is said Y minimum value, and k is an integer for defining a maximum value of $Y_iH - Y_iL$.

* * * * *